(12) United States Patent
Özer et al.

(10) Patent No.: US 8,732,523 B2
(45) Date of Patent: May 20, 2014

(54) DATA PROCESSING APPARATUS AND METHOD FOR ANALYSING TRANSIENT FAULTS OCCURRING WITHIN STORAGE ELEMENTS OF THE DATA PROCESSING APPARATUS

(75) Inventors: Emre Özer, Great Shelford (GB); Yiannakis Sazeides, Nicosia (CY); Daniel Kershaw, Cambridge (GB); Stuart David Biles, Bury St Edmunds (GB)

(73) Assignee: ARM Limited, Cambridge (GB)

( * ) Notice: Subject to any disclaimer, the term of this patent is extended or adjusted under 35 U.S.C. 154(b) by 268 days.

(21) Appl. No.: 13/317,593

(22) Filed: Oct. 24, 2011

(65) Prior Publication Data

US 2013/0103972 A1 Apr. 25, 2013

(51) Int. Cl.
*G06F 11/00* (2006.01)

(52) U.S. Cl.
USPC ............. 714/20; 714/6.1; 714/30; 714/42; 726/22

(58) Field of Classification Search
USPC .............. 714/2, 6.1, 6.2, 6.21, 20, 25, 30, 42; 726/22, 23, 25, 34
See application file for complete search history.

(56) References Cited

U.S. PATENT DOCUMENTS

| | | | |
|---|---|---|---|
| 4,209,846 A | 6/1980 | Seppa | |
| 5,898,711 A * | 4/1999 | Buer | 714/800 |
| 6,694,454 B1 * | 2/2004 | Stanley | 714/30 |
| 6,990,611 B2 * | 1/2006 | Busser | 714/6.12 |
| 7,278,080 B2 | 10/2007 | Flautner et al. | |
| 7,283,410 B2 * | 10/2007 | Hsu et al. | 714/42 |
| 2010/0031064 A1 * | 2/2010 | Walmsley | 713/194 |
| 2012/0084615 A1 * | 4/2012 | Ozawa | 714/746 |

OTHER PUBLICATIONS

Boneh et al., "On the Importance of Checking Cryptographic Protocols for Faults", Security and Cryptography Research Group, Bellcore, New Jersey, pp. 1-14.
Kommerling et al., "Design Principles for Tamper-Resistant Smartcard Processors", Advanced Digital Security Research, Riedelberg, Germany, University of Cambridge Computer Laboratory, Cambridge, United Kingdom, pp. 1-12.
Skorobogatov et al., "Optical Fault Induction Attacks", University of Cambridge, Computer Laboratory, Cambridge, United Kingdom, Springer-Verlag Berlin Heidelberg 2003, 11 pages.
Gammel et al., "Smart Cards Inside", Infineon Technologies AG, St-Martin-Str. Munich, Germany, 6 pages.

(Continued)

*Primary Examiner* — Joseph D Manoskey
(74) *Attorney, Agent, or Firm* — Nixon & Vanderhye P.C.

(57) ABSTRACT

A data processing apparatus has a plurality of storage elements residing at different physical locations within the apparatus, and fault history circuitry for detecting local transient faults occurring in each storage element, and for maintaining global transient fault history data based on the detected local transient faults. Analysis circuitry monitors the global transient fault history data to determine, based on predetermined criteria, whether the global transient fault history data is indicative of random transient faults occurring within the data processing apparatus, or is indicative of a coordinated transient fault attack. The analysis circuitry is then configured to initiate a countermeasure action on determination of a coordinated transient fault attack. This provides a simple and effective mechanism for distinguishing between random transient faults that may naturally occur, and a coordinated transient fault attack that may be initiated in an attempt to circumvent the security of the data processing apparatus.

19 Claims, 9 Drawing Sheets

(56) References Cited

OTHER PUBLICATIONS

Agoyan et al., "Single-Bit DFA Using Multiple-Byte Laser Fault Injection", Department Systemes et Architectures Securisees, Cea-Leti, Gardanne, France, Ecole Nationale Superieure des Mines de Saint-Etienne, Gardanne, France, Equipe de cryptographie, Ecole normale superieure, Paris, France, IEEE, 2010.

Das et al., RazorII: In Situ Error Detection and Correction for PVT and SER Tolerance, IEEE Journal of Solid-State Circuits, vol. 44, No. 1, Jan. 2009 pp. 32-48.

McDermott et al., "Merging Paradigms of Survivability and Security: Stochastic Faults and Designed Faults", New Security Paradigms Workshop, 2003 Ascona Switzerland, pp. 19-25.

Bar-El, et al., The Sorcerer's Apprentice Guide to Fault Attacks, Proceedings of the IEEE, vol. 94, No. 2, Feb. 2006, pp. 370-382.

Basile et al., "An Approach for Detecting and Distinguishing Errors versus Attacks in Sensor Networks", Center for Reliable and High-Performance Computing, University of Illinois at Urbana-Champaign, IL, Proceedings of the 2006 International Conference on Dependable Systems and Networks, IEEE. 2006, 10 pages.

Moratelli et al., A Cryptography Core Tolerant to DFA Fault Attacks, PPGC-Instituto de Informatica, UFRGS, Porto Alegre, Brasil, PPGEE- Depto. Engenharia Electrica, UFRGS, Proto Alegre, Brasil, SBCCI'06, Aug. 28-Sep. 1, 2006, Minas Gerais, Brazil, pp. 190-195.

Leveugle, Early Analysis of Fault-Based Attack Effects in Secure Circuits, IEEE Transactions on Computers, vol. 56, No. 10, Oct. 2007, pp. 1431-1434.

PCT International Search Report and Written Opinion of the International Searching Authority mailed Nov. 28, 2012 in PCT/GB2012/052204.

A. Bondavilli et al, "Threshold-Based Mechanisms to Discriminate Transient from Intermittent Faults" *IEEE Transactions on Computers*, vol. 49, No. 3, Mar. 2000, pp. 230-245.

\* cited by examiner

Decision: Random Fault (Most likely a random SEU)
Action   : Recover

Decision: Suspicious activity (Locally SEU but globally MEU situation)
Action   : Reset or Wipe out Keys

DATA PROCESSING APPARATUS AND METHOD FOR ANALYSING TRANSIENT FAULTS OCCURRING WITHIN STORAGE ELEMENTS OF THE DATA PROCESSING APPARATUS

BACKGROUND OF THE INVENTION

1. Field of the Invention

The present invention relates to a data processing apparatus and method for analysing transient faults occurring within storage elements of a data processing apparatus.

2. Description of the Prior Art

Many modern data processing systems require mechanisms to be put in place to detect occurrences of faults. Some faults, such as an undesired short or open circuit, will cause a permanent fault within the system. However, not all faults are permanent in nature. In particular, transient faults, also called single event upsets (SEUs), may occur due to electrical noise or external radiation. Radiation can, directly or indirectly, induce localised ionisation events capable of upsetting internal data states. While the upset causes a data error, the circuit itself is undamaged and the system experiences a transient fault. The data upsetting is called a soft error, and detection of soft errors is of significant concern in many applications.

A data processing apparatus will typically include one or more storage structures containing storage elements, and an SEU may cause a flip in the state of a storage element, hence giving rise to a transient fault. Given the sources of radiation that can give rise to SEUs in a typical working environment of a data processing system, the SEUs are random in nature. Further, given the high clock speeds at which data processing systems typically operate, many clock cycles will typically elapse between each transient fault caused by an SEU.

A number of known techniques have been developed for providing resilience to such random transient faults within a data processing apparatus. For example, error detection mechanisms such as parity checking mechanisms can be used to detect whether a data value has changed between the time it was written into a storage element and the time it is read out from that storage element, such a change indicating a transient fault. Once a transient fault has been detected, a suitable corrective action can be taken, for example flushing the relevant parts of the data processing apparatus and re-executing instructions where required.

In addition to simple fault detection mechanisms, a number of known techniques have been developed which not only detect a random transient fault, but also correct that fault in situ so as to provide improved performance. For example, error correction code (ECC) mechanisms can be used to detect and correct such errors, and indeed ECC mechanisms are often used in memory arrays for this purpose. Other known techniques include redundancy techniques such as dual modular redundancy (DMR) or triple modular redundancy (TMR), which are often used in association with storage elements provided within a data path of a data processing system. These redundancy techniques can be implemented as spatial redundancy or time redundancy, or a combination of both.

Such fault detection and correction circuits can be embodied in a variety of ways, but in one particular example may take the form of a single event upset (SEU) tolerant flip-flop such as discussed in commonly owned U.S. Pat. No. 7,278,080, the entire contents of which are hereby incorporated by reference, this patent describing a design technique sometimes referred to as "Razor". A further paper that describes the Razor technique is "Razor II: In-Situ Error Detection and Correction for PVT and SER Tolerance", IEEE Journal of Solid-State Circuits (JSSC), Volume 44, No. 1, Jan. 2009.

Whilst transient faults occur randomly due to the environment in which the data processing system is operated, it is also known to seek to inject transient faults in a more systematic manner in order to seek to compromise security of a data processing system. For example, the security of processor cores and cryptographic engines can be compromised by injecting deliberate faults by attackers. By such an approach, a fault injected into a secure chip can expose security keys and/or secure data to the attacker. Known fault injection attack techniques are described in a number of prior art articles, such techniques including optical fault attacks using a laser gun, flash camera, X-rays and ion beams, as for example discussed in the article by S. P. Skorobogatov and R. J. Anderson, entitled "Optical fault induction attacks", Proceedings of the 4th International Workshop on Cryptographic Hardware and Embedded Systems (CBES), 2002. Some other articles that provide a useful summary of fault injection attacks are:

R. Leveugle, "Early Analysis of Fault-Based Attack Effects in Secure Circuits", IEEE Transaction on Computers, Vol. 56, No. 10, October 2007.

Dan Boneh, Richard A. DeMillo, and Richard J. Lipton, "On the Importance of Checking Cryptographic Protocols for Faults", Advances in Cryptology-EUROCRYPT '97, International Conference on the Theory and Application of Cryptographic Techniques, May 1997.

O. Kömmerling and M. G. Kuhn, "Design principles for Tamper-Resistant Smartcard Processors", Proceedings of the USENIX Workshop on Smartcard Technology, 1999.

B. M. Gammel and S. J. Riiping, "Smart Cards Inside", Proceedings of the 31st European Solid-State Circuits Conference, 2005. ESSCIRC, 2005.

Agoyan, M.; Dutertre, J.-M.; Mirbaha, A.-P.; Naccache, D.; Ribotta, A.-L.; Tria, "A Single-bit DFA using multiple-byte laser fault injection", IEEE International Conference on Technologies for Homeland Security (HST), 2010.

Attackers typically use transient fault injection sources in a coordinated way by scanning the surface of a chip either in its de-packaged or packaged state. When a coordinated photon or ion hits a storage cell, it may flip the bit stored in the cell causing a transient fault.

As pointed out in the article by J. McDermott, A. Kim and J. Froscher, entitled "Merging Paradigms of Survivability and Security: Stochastic Faults and Designed Faults", Proceedings of the 2003 Workshop on New Security Paradigms, 2003, there have until now been two classes of communities dealing with the issues of faults, namely the reliability and fault tolerance community, and the security community. Whilst both communities consider the issue of how to deal with faults, the communities have traditionally had strikingly different views of the type of faults that exist, the way they are modelled, and how they are addressed, and the above article proposes that security and fault tolerance should be considered together.

The article by H. Bar-El, H. Choukri, D. Naccache, M. Tunstall, and C. Whelan, entitled "The Sorcerer's Apprentice Guide to Fault Attacks", Proceedings of Workshop on Fault Detection and Tolerance in Cryptography, June 2004, describes the use of spatial hardware and software redundancy techniques used by the fault tolerance community, for example DMR and TMR techniques, in order to detect security-related faults. The proposed techniques either replicate hardware blocks (N modular) or use the same hardware block but re-execute multiple times, in order to detect security-related faults. The faults are detected and corrected locally, and the article does not discuss differentiating a security-related transient fault attack from random transient faults occurring naturally.

The article by C. R. Moratelli, É. Cota, M. S. Lubaszewski, entitled "A Cryptography Core Tolerant to DFA Fault Attacks", Proceeding SBCCI '06 Proceedings of the 19th Annual Symposium on Integrated Circuits and Systems Design, 2006, describes cryptographic hardware in the form of a DES (Data Encryption Standard) core being assisted by an accompanying hardware block that is a partially duplicated version of the DES core, in order to detect and correct injected transient faults by re-execution. As with the earlier-discussed article "The Sorcerer's Apprentice Guide to Fault Attacks", this article uses redundancy mechanisms (the partially duplicated core) and re-execution, and the described techniques do not provide for any differentiation between a security-related transient fault attack and random transient faults occurring naturally.

In the unrelated field of distributed sensors within a sensor network, the article by C Basile, M Gupta, Z Kalbarczyk and R Iyer entitled "An approach for Detecting and Distinguishing Errors versus Attacks in Sensor Networks", Proceedings of the 2006 International Conference on Dependable Systems and Networks, DSN'06, describes a technique for dealing with corrupted sensor data, whilst using Hidden Markov Models (HMMs) to diagnose and characterise the nature of detected anomalies with the aim of distinguishing errors from attacks. In particular, by use of these powerful mathematical models, the described technique aims to distinguish faulty data from malicious data in a distributed sensor network. However, HMMs need the models of each error and attack type in order to properly identify each attack and each error. The error types that can be detected using the techniques described in the article are non-random errors such as "stuck-at-value", "calibration" and "additive" errors. These errors are by their nature not transient and not random and indeed towards the end of section 3 of the article it is noted that it is difficult to correctly classify a random noise error as there is no fixed pattern observed in the observation symbol probability distribution. Accordingly, such an approach based on HMMs would not be useful within the earlier described field of data processing systems in order to seek to distinguish between random transient faults occurring naturally and a coordinated transient fault attack.

Accordingly, it would be desirable to develop a technique which would enable transient faults occurring within storage elements of a data processing apparatus to be analysed in order to seek to distinguish random transient faults from a coordinated transient fault attack.

SUMMARY OF THE INVENTION

Viewed from a first aspect, the present invention provides a data processing apparatus comprising: a plurality of storage elements residing at different physical locations within the data processing apparatus; fault history circuitry configured to detect local transient faults occurring in each storage element of said plurality of storage elements, and to maintain global transient fault history data based on the detected local transient faults; and analysis circuitry configured to monitor the global transient fault history data in order to determine based on predetermined criteria whether the global transient fault history data is indicative of random transient faults occurring within the data processing apparatus or is indicative of a coordinated transient fault attack, the analysis circuitry being further configured to initiate a countermeasure action on determination of said coordinated transient fault attack.

The inventors of the present invention realised that the known techniques for detecting (and optionally correcting) transient faults are applied locally to individual storage elements, and that when considering the local viewpoint it is extremely difficult to distinguish between a random transient fault occurring naturally and a transient fault, injected deliberately. However, the inventors realised that if a more global view could be taken of the transient faults occurring within the data processing apparatus, such a distinction could be made by analysis of the overall global fault behaviour. More particularly, when a photon or ion hits a storage cell it may flip the bit stored in the cell causing a transient fault. If that transient fault is not merely a random transient fault occurring naturally, but is occurring due to a coordinated transient fault attack, the inventors realised that multiple strikes are likely to occur within the data processing apparatus over a relatively short period of time (either due to the imprecise nature of the fault injection source and/or due to the repeated nature of the fault injection), and hence if a more global view of the transient faults occurring can be provided, such a pattern of activity can be detected and be used to infer the presence of a coordinated transient fault attack.

The technique of the present invention provides fault history circuitry which detects the local transient faults occurring in each storage element, but maintains a global transient fault history based on the detected local transient faults (for example by accumulating the individual local transient faults detected over a period of time). Analysis circuitry then monitors the global transient fault history in order to determine, based on selected criteria, whether that history is indicative of random transient faults occurring within the data processing apparatus or is indicative of a coordinated transient fault attack. The analysis circuitry can then be arranged to initiate a countermeasure action on determination of a coordinated transient fault attack. The countermeasure action can take a variety of forms, for example resetting the data processing apparatus or, if desired, wiping out secret keys and data to avoid such secret keys and data being obtained by the attacker. By only restricting such countermeasure actions to activities determined by the analysis circuitry as being coordinated transient fault attacks, random transient fault attacks can continue to be detected and handled using known fault tolerance techniques, thereby significantly improving performance when compared with known prior art techniques.

There are a number of ways in which the global transient fault history data can be constructed based on the detected local transient faults, but in one embodiment the global transient fault history data indicates both spatial and temporal transient fault behaviour within the data processing apparatus. In one particular embodiment, this is achieved by storing transient fault information for each storage element (hence providing spatial fault behaviour) and in addition by keeping a record of the transient faults occurring at each storage element over a period of time (thereby obtaining temporal fault behaviour). In one particular embodiment, the fault history circuitry maintains the global transient fault history data based on detected local transient faults occurring within a predetermined timing window, and the history data takes the form of a history matrix identifying for each storage element any local transient faults detected within that predetermined timing window.

The fault history circuitry can take a variety of forms, but in one embodiment comprises local fault detection circuitry associated with each storage element, and fault history maintenance circuitry configured to maintain the global transient fault history data based on local transient fault data received from each local fault detection circuitry. However, in alternative embodiments, the provision of local fault detection circuitry associated with each storage element may not be required, since the content of each storage element may directly identify whether there is a local transient fault or not. For example, when the plurality of storage elements are formed by a plurality of dedicated dummy storage elements provided solely for use by the fault history circuitry, those dummy storage elements may all be reset to a predefined state, such that a local transient fault can be assumed to have occurred if any storage element's stored state changes from that predefined state.

In one embodiment, each local fault detection circuitry is configured to correct local transient faults detected in the associated storage element. This can be achieved by using suitable fault detection and correction circuits to form each local fault detection circuitry, for example a known DMR or TMR circuit. When the local fault detection circuitry is constructed in such a manner that it can correct the local transient faults in situ, then if the analysis circuitry subsequently determines that the global transient fault history data is indicative of random transient faults occurring within the data processing apparatus, no corrective action needs to be initiated by the analysis circuitry, since the appropriate corrective action will already have been performed by the local fault detection circuits themselves.

However, in an alternative embodiment where the local fault detection circuits merely detect transient faults but do not themselves correct them, the analysis circuitry can be arranged to be responsive to determining that the global transient fault history data is indicative of random transient faults occurring within the data processing apparatus, to initiate a corrective active within the data processing apparatus. Such a corrective action can take any appropriate form, for example flushing the relevant parts of the data processing apparatus, and re-executing instructions where required.

In one embodiment where the global transient fault history data is based on detected local transient faults occurring within a predetermined timing window, the predetermined criteria used by the analysis circuitry to detect the presence of a coordinated transient fault attack may comprise the global transient fault history data indicating that a number of local transient faults above a predetermined threshold have been detected within said predetermined timing window. The predetermined threshold can be set dependent on implementation, but typically the predetermined threshold can be set at one local transient fault since, having regard to the environment in which the data processing apparatus is used and the clock frequency of the data processing apparatus, it would typically be expected that no more than a single local transient fault would be observed within the global transient fault history data within the predetermined timing window.

It will often be the case that the tools used by the attacker to inject transient faults will not be precise enough to inject only a single transient fault at a particular point in time, and instead may cause a number of transient faults to occur based on the applied stimulus, for example light from an optical source. Considering the global transient fault history data, it would hence be expected in such instances that multiple local transient faults will appear within the global transient fault history data within the predetermined timing window, and hence such coordinated transient fault attacks will be identified by the analysis circuitry based solely on a review of the global transient fault history data.

However, in certain situations, for example if the attack is performed in a laboratory environment using precise ionising radiation equipment, it may be possible for the attacker to inject only a single transient fault at any point in time. The attack may then be repeated so that a transient fault is injected at regular intervals, but those intervals may be relatively large, for example every hundred processor cycles, and that may exceed the predetermined timing window size over which the global transient fault history data is maintained. Accordingly, if the global history timing depth is smaller than the repeat interval of the attack, the analysis circuitry could interpret such activities as being indicative of random transient faults and hence not initiate the countermeasure action.

However, in one embodiment, in order to address such a possible scenario, the fault history circuitry is configured to maintain a fault tracking timer which is initialised to a first value whenever the analysis circuitry evaluates that a current state of the global transient fault history data is indicative of random transient faults occurring within the data processing apparatus. The fault tracking timer is configured to adjust its value periodically until a second value is reached, and the analysis circuitry is configured to determine the presence of a coordinated transient fault attack if the global transient fault history data is indicative of random transient faults occurring within the data processing apparatus but the fault tracking timer does not have said second value. The first value, second value, and direction of adjustment can be selected dependent on implementation, but in one embodiment the first value is a chosen maximum value and the fault tracking timer is arranged to decrement that value each clock cycle, with the second value then being a logic zero value. Accordingly, in such embodiments, even if at the time the analysis is performed, the analysis circuitry takes the view that the global transient fault history data is indicative of random transient faults, it will still determine the presence of a coordinated transient fault attack if at that time the fault tracking timer has a non-zero value. Accordingly, by such an embodiment, very precise single bit upset attacks repeated at relatively long intervals can still be identified, causing the countermeasure action to be initiated.

The storage elements referenced by the fault history circuitry can take a variety of forms. However, in one embodiment said plurality of storage elements are active storage elements provided for reference by processing circuitry within the data processing apparatus when performing data processing operations. In one particular embodiment, the plurality of storage elements comprise a series of pipeline registers separating pipeline stages of pipelined processing circuitry within the data processing apparatus. Alternatively, or in addition, the plurality of storage elements may form part of a storage device within the data processing apparatus, examples of such a storage device being a cache, a translation lookaside buffer (TLB), a register file, etc. Hence, in one example embodiment, in addition to pipeline register storage elements, additional storage elements may also be included in the form of cache lines or portions of cache lines accessed by the pipelined processing circuitry when executing an instruction, registers within a register file, TLB entries, etc.

The manner in which the local transient fault data from each storage element is used to update the global transient fault history data can take a variety of forms. However, in one embodiment where local fault detection circuitry is associated with each pipelined stage, then for each instruction processed through the pipelined processing circuitry, the local transient fault data output by the local fault detection circuitry associated with each said pipelined stage is collated to form a transient fault history vector for said instruction. The fault history circuitry then maintains as said global transient fault history data the transient fault history vector for a predetermined plurality of said instructions. Hence, in such embodiments, as the execution of each instruction completes, the transient fault history vector constructed for that instruction is passed to the fault history circuitry to form a new entry within the global transient fault history data. In a typical implementation where the global transient fault history data storage is of a fixed size, as each new transient fault history vector is added, the oldest transient fault history vector within the global transient fault history data is discarded, such that at any point in time the global transient fault history data represents a sliding window in time consisting of a plurality of transient fault history vectors for an associated plurality of instructions.

Whilst in one embodiment the storage elements are active storage elements provided for reference by the processing circuitry when performing data processing operations, in an alternative embodiment the plurality of storage elements may be dummy storage elements not referenced by processing circuitry within the data processing apparatus when performing data processing operations in a normal operating mode, the dummy storage elements each being reset to a predefined state, and a local transient fault in each storage element being detected when its stored state changes from said predefined state.

In one particular embodiment, such dummy storage elements may be provided solely for reference by the fault history circuitry, and in such embodiments can be randomly distributed within the data processing apparatus. By such a random distribution of the dummy storage elements, this increases the likelihood that a transient fault injection attack will cause transient faults to occur in those dummy storage elements.

As an alternative to the introduction of dummy storage elements solely for the purpose of reference by the fault history circuitry, or in addition thereto, one or more of the dummy storage elements may be formed by storage elements already provided within the data processing apparatus for use in a mode of operation other than the normal operating mode. For example, the data processing apparatus will typically include debug and/or trace circuits which are used in debug and trace modes of operation in order to assist in the identification of any incorrect operation of the data processing apparatus. However, following such debug and/or tracing activities, when the data processing apparatus is then used in its normal mode of operation, those circuits are typically not used. Those circuits will typically include a number of storage elements, and often those storage elements will be distributed at various locations within the data processing apparatus. In one embodiment, those storage elements can be reused to form at least some of the storage elements used by the fault history circuitry to maintain global transient fault history data, thereby reducing the amount of hardware that needs to be added to the data processing apparatus to provide the local transient fault data required to maintain the global transient fault history data.

Whilst debug and/or trace circuits may provide suitable circuits for the provision of the required dummy storage elements, it will be appreciated that various other circuits within the data processing apparatus may also be used. For example, in a multi-core implementation, there may be certain modes of operation where one or more of the cores are not used, and again those cores may be used in such modes of operation to provide at least some of the dummy storage elements required.

By using dummy storage elements rather than active storage elements, the detection of errors can be simplified. For example, when using dummy storage elements, the values in the those dummy storage elements can be reset to a predefined state and any change in that state directly indicates a local transient fault without the need for any dedicated local fault detection circuitry. In one embodiment, the dummy storage elements may be arranged to automatically self-reset back to the predefined state in the clock cycle after their state has been flipped by a transient fault. Alternatively they may be "sticky", such that once their state has been flipped, that state will remain in the flipped state until it is reset. In embodiments where the dummy storage elements are "sticky", additional functionality can be provided to reset the dummy storage elements to the predefined state on occurrence of one or more predetermined events. For example, in one embodiment, the dummy storage elements may be reset to said predefined state whenever the analysis circuitry evaluates that a current state of the global transient fault history data is indicative of random transient faults occurring within the data processing apparatus. By such an approach, it can be ensured that if the analysis circuitry identifies multiple local transient faults within the global transient fault history data, it can interpret that condition as being indicative of a coordinated transient fault attack.

Viewed from a second aspect, the present invention provides a method of analysing transient faults within a data processing apparatus, comprising: detecting local transient faults occurring within each storage element of a plurality of storage elements residing at different physical locations within the data processing apparatus; maintaining global transient fault history data based on the detected local transient faults; monitoring the global transient fault history data in order to determine based on predetermined criteria whether the global transient fault history data is indicative of random transient faults occurring within the data processing apparatus or is indicative of a coordinated transient fault attack; and initiating a countermeasure action on determination of said coordinated transient fault attack.

Viewed from a third aspect, the present invention provides a data processing apparatus comprising: a plurality of storage element means residing at different physical locations within the data processing apparatus; fault history means for detecting local transient faults occurring in each storage element means of said plurality of storage element means, and for maintaining global transient fault history data based on the detected local transient faults; and analysis means for monitoring the global transient fault history data in order to determine based on predetermined criteria whether the global transient fault history data is indicative of random transient faults occurring within the data processing apparatus or is indicative of a coordinated transient fault attack, the analysis means for initiating a countermeasure action on determination of said coordinated transient fault attack.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
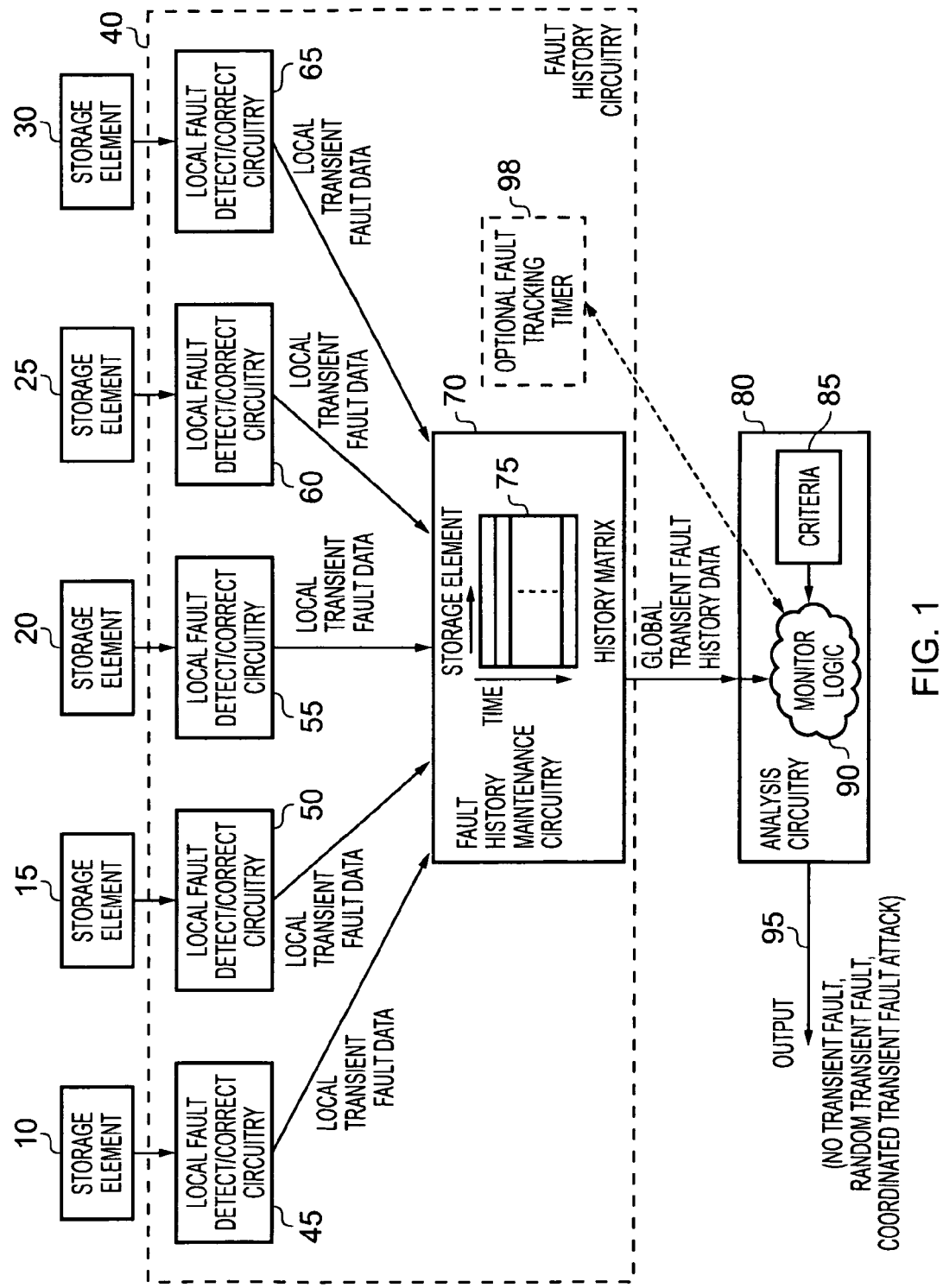
FIG. 1 is a block diagram schematically illustrating a data processing apparatus in accordance with one embodiment.

FIG. 1 is a block diagram of a data processing apparatus in accordance with one embodiment. As illustrated, a plurality of storage elements 10, 15, 20, 25, 30 are provided, these storage elements residing at different physical locations within the data processing apparatus. The degree to which the individual storage elements are spaced from one another will vary dependent on implementation. However, in one embodiment the storage elements are placed so as to be physically close to areas of the data processing apparatus that are expected to be the target of a coordinated transient fault attack. For example, if a data processing apparatus includes a secure processor core, and it is expected that a coordinated transient fault attack may be targeted at that core in order to seek to expose the secret keys or secret data, then the storage elements can be located within or around the secure core. More generally, if it is desired to provide protection against coordinated transient fault attacks anywhere within the data processing apparatus, the storage elements will ideally be distributed throughout the data processing apparatus, so as to increase the likelihood that a coordinated transient fault attack will trigger transient faults within a number of the storage elements.

In one embodiment, the storage elements may consist of active storage elements used by the processing circuitry when performing data processing operations, or alternatively the storage elements may be formed from dummy storage elements which are not used by processing circuitry of the data processing apparatus during one or more modes of operation. When using dummy storage elements, this may allow more flexibility as to where the individual storage elements are placed within the data processing apparatus. For example, if the dummy storage elements are added solely for use in differentiating between random transient faults and a coordinated transient fault attack, then those storage elements may be distributed randomly within the data processing apparatus having regards to the space constraints of a particular layout. In other embodiments, at least some of the dummy storage elements could be provided by storage elements within pre-existing circuitry of the data processing apparatus that is not used in the normal operating mode, for example storage elements within debug circuitry, trace circuitry, etc. Indeed, other components of the data processing apparatus may also be candidates for the provision of such storage elements, for example a processor core in a multi-core implementation, in situations where that core is not used in one or more modes of operation, etc.

As shown in FIG. 1, the contents of each of the storage elements is provided to fault history circuitry 40 which is arranged to detect local transient faults occurring in each storage element, and to maintain a global transient fault history based on the detected local transient faults. In the example illustrated in FIG. 1, the fault history circuitry 40 contains local fault detection and/or correction circuitry 45, 50, 55, 60, 65 for each storage element 10, 15, 20, 25, 30. Such local fault detection/correction circuitry can be embodied using any of a number of known techniques. For example, parity checking mechanisms can be used to provide local fault detection circuits, whilst more complicated circuits such as ECC, DMR or TMR circuits can be used to provide local fault detection and correction circuits.

Using these known techniques, each fault detection/correction circuit can determine when a transient fault has occurred within the contents of the associated storage element, and identify such local transient faults within local transient fault data provided to fault history maintenance circuitry 70 within the fault history circuitry 40.

The fault history maintenance circuitry of one embodiment maintains a history matrix 75 which keeps a record of the observed global transient fault behaviour over a period of time, based on the inputs received from the various local fault detection/correction circuits. In one embodiment, the history matrix can be considered to comprise a plurality of history vectors, where each history vector contains a transient fault indication for each of the storage elements 10, 15, 20, 25, 30, hence identifying whether a local transient fault has been detected, and if so in which storage element. Multiple history vectors obtained at different points in time are retained within the history matrix at any point in time, so that the history matrix provides a sliding time window of global transient fault information.

Analysis circuitry 80 is provided which incorporates monitoring logic 90 for analysing the current contents of the history matrix 75, these current contents also being referred to herein as the global transient fault history data. The monitoring function 90 has access to some predetermined criteria 85, such criteria being either fixed or programmable. Based on the criteria, the monitoring function will determine whether the current global transient fault history data indicates that no transient faults have been observed, indicates the presence of a random transient fault situation, or indicates the presence of a coordinated transient fault attack. More details of the analysis performed by the monitoring logic 90 will be discussed later with reference to the flow diagram of FIG. 2.

If a coordinated transient fault attack is detected, then an indication to that effect can be output over the path 95. This indication can be used in a variety of ways, but in one embodiment is used to initiate a countermeasure action. The countermeasure action can take a variety of forms, but in one embodiment may comprise resetting the data processing apparatus or if desired, wiping out secret keys and data in order to avoid such secret keys and data being available to the attacker.

In situations where the analysis circuitry 80 determines that a random transient fault condition has arisen, whether any further action is appropriate will depend on the type of circuits used to form the local fault detection/correction circuitry 45, 50, 55, 60, 65. In particular, if those circuits have corrected the transient fault locally, then no further action is required. However, if they are simply used to detect transient faults, and do not themselves correct the transient faults, then the analysis circuitry can trigger appropriate corrective action in order to correct the transient faults. Such corrective action can take a variety of forms, but in one embodiment may involve flushing the relevant parts of the data processing apparatus and re-executing instructions where required.

It will be appreciated however that the need for corrective action will depend on the form of storage elements used. For example, if the storage elements are dummy storage elements rather than active storage elements, no corrective action may in fact be necessary.

As indicated by the dotted box 98 in FIG. 1, the fault history circuitry 40 may also include an optional fault tracking timer whose value can be provided to the monitoring logic 90 for reference when seeking to determine the presence of a coordinated transient fault attack. As will be discussed in more detail later with reference to FIGS. 7A and 7B, this can be useful in situations where a very precise attack takes place, with the attack being repeated at intervals which exceed the depth of the history matrix.

Figure 2:
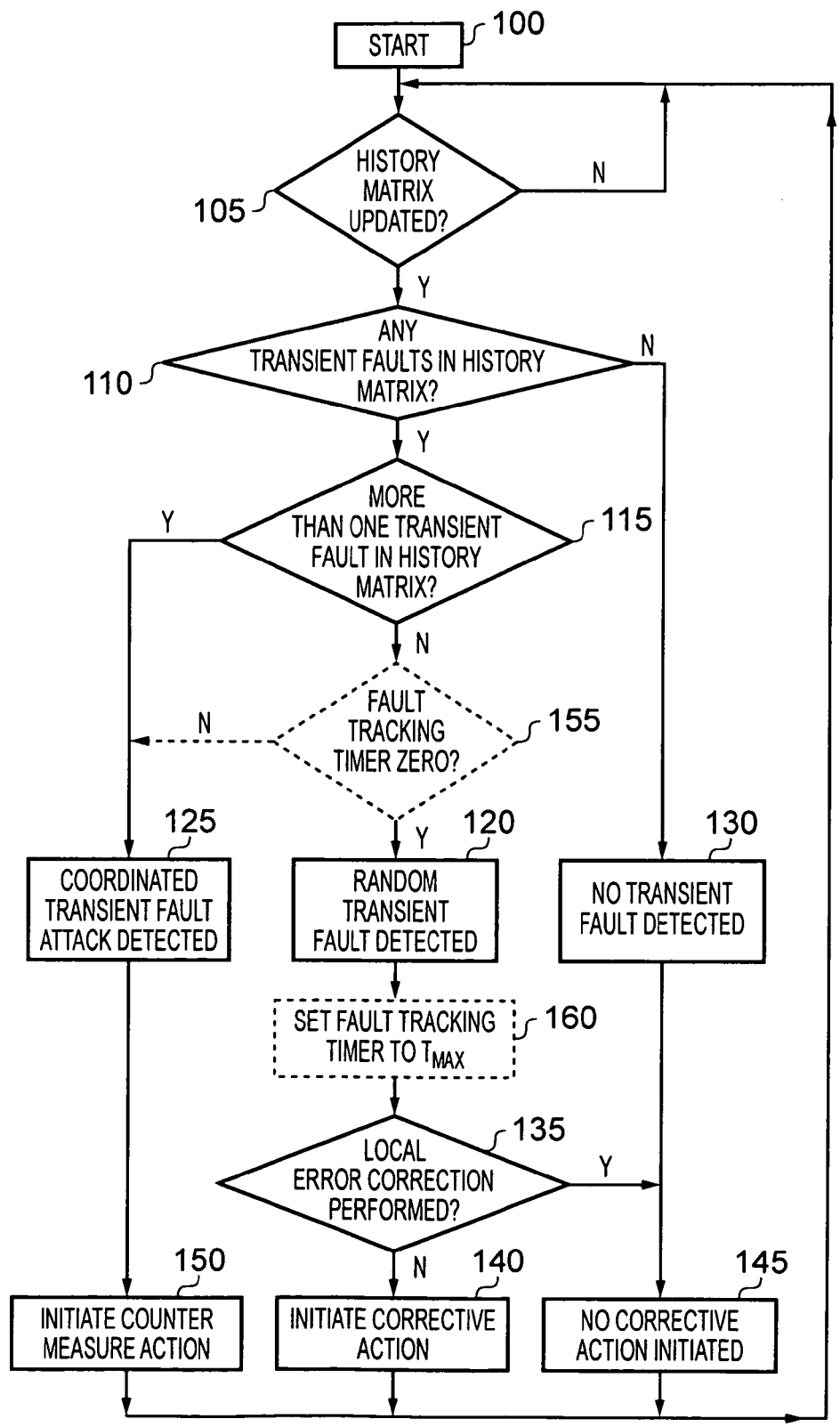
FIG. 2 is a flow diagram illustrating the operation of the analysis circuitry of FIG. 1 in accordance with one embodiment.

FIG. 2 is a flow diagram illustrating the operation of the monitoring function 90 within the analysis circuitry 80 in accordance with one embodiment. The process starts at step 100, whereafter at step 105, it is determined whether the history matrix has been updated. If not, no action is required and the process waits at step 105 until the history matrix has been updated.

Once the history matrix has been updated, it is determined at step 110 whether there are any transient faults indicated in the history matrix. If not, it is determined at step 130 that no transient faults have been detected, and the process proceeds to step 145 where no corrective action is initiated and the process then returns to step 105.

However, if there are one or more transient faults identified in the history matrix, then at step 115 it is determined whether more than one transient fault is present in the history matrix. The value "one" may be specified in the criteria 85, and in certain situations may take a value other than one. However, in a typical implementation, having regards to the depth of the history matrix and the frequency with which transient faults would be expected to occur naturally, if there is more than one transient fault in the history matrix at any point in time, this can be used to infer the presence of a coordinated transient fault attack rather than a random transient fault situation.

Accordingly, as shown in FIG. 2, if more than one transient fault is detected in the history matrix at step 115, the process proceeds to step 125, where it is concluded that a coordinated transient fault attack has been detected. Thereafter, at step 150, a countermeasure action is initiated, whereafter the process returns to step 105.

If at step 115 it is determined that there is not more than one transient fault in the history matrix, then in one embodiment the process proceeds directly to step 120, where it is determined that a random transient fault situation has been detected. In that embodiment, the process then proceeds to step 135 where it is determined whether any local error correction has been performed by the circuits 45, 50, 55, 60, 65. If not, a corrective action is initiated at step 140 in order to cause the transient fault to be corrected. However, if local error correction has already been performed, the process branches to step 145 where no corrective action is initiated, whereafter the process returns to step 105.

The two dotted boxes 155 and 160 illustrated in FIG. 2 identify additional steps performed in an alternative embodiment that incorporates the optional fault tracking timer 98. In this embodiment, as shown by step 160, whenever a random transient fault is detected at step 120 by the monitoring logic 90, the fault tracking timer is set to a predetermined maximum value $T_{MAX}$. Thereafter, the value of the timer is decremented each clock cycle. The value of $T_{MAX}$ is chosen so that when normal naturally occurring transient faults are taking place, the timer will have decremented to zero before any further random transient fault is detected.

Accordingly, if at step 115 it is detected that there is not more than one transient fault in the history matrix, the fault tracking timer is first evaluated at step 155 before a final conclusion as to whether a random transient fault situation or a coordinated transient fault attack is being observed. In particular, if at step 155 it is determined that the fault tracking timer is not yet zero, then the process branches to step 125 where it is determined that a coordinated transient fault attack has been detected. However, if the fault tracking timer is zero, then this indicates that there truly is just a random transient fault condition, and accordingly the process proceeds to step 120.

Figure 3:
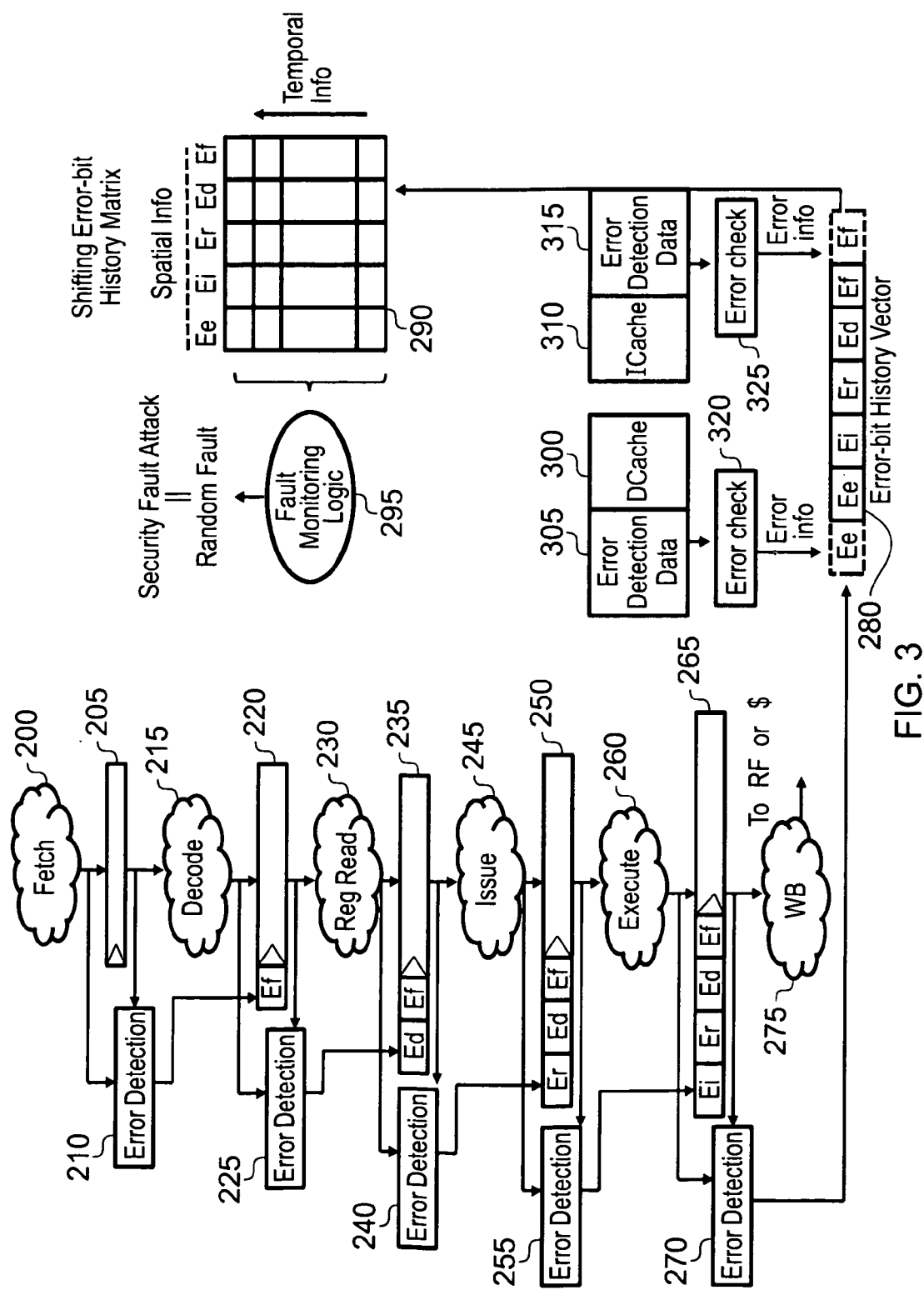
FIG. 3 is a diagram schematically illustrating a data processing apparatus in accordance with one embodiment.

FIG. 3 illustrates an example embodiment where at least some of the plurality of storage elements referenced when constructing the history matrix are pipeline registers separating pipeline stages of a pipelined processor. In particular, the pipelined processor has a number of processing stages, the fetch stage 200 being used to fetch an instruction for execution (this for example typically involving an access in the instruction cache 310), with the decode stage 215 then performing a decode operation on that instruction prior to the register read stage 230 then accessing the specified source registers in the register bank in order to obtain the operands to be subjected to the operation specified by the instruction. The instruction is then issued during a stage 245, whereafter in pipeline stage 260 it is executed in order to produce a result operand. In the writeback stage 275 that result operand is then written back to the register file or to a cache such as the data cache 300. As is standard practice for such pipelined processors, the results of the computations performed by each of the pipeline stages 200, 215, 230, 245, 260 are latched in the pipeline registers 205, 220, 235, 250, 265 at the end of each clock cycle, thus providing a mechanism for the result produced by one pipeline stage to be passed into the subsequent pipeline stage.

As shown in FIG. 3, error detection circuits 210, 225, 240, 255, 270 are associated with each of the pipeline registers 205, 220, 235, 250, 265, respectively. Each error detection circuit evaluates the data at the time it is written into the associated pipeline register and as it is output from that pipeline register in order to detect any difference between the two values. Such a difference is indicative of a transient fault.

In the embodiment illustrated in FIG. 3, the output of each error detection stage is forwarded so as to be appended to the contents in the subsequent pipeline register, such that during execution of each instruction, an error-bit history vector is constructed for that instruction.

In the embodiment illustrated in FIG. 3, the output of each error detection circuit is a single bit value, with a logic one value indicating the presence of an error and a logic zero value indicating that there is no error. As will be appreciated from FIG. 3, any particular error detection stage takes into consideration the error bit(s) from previous pipeline stages when detecting errors, such that the output error bits become part of the data in the pipeline register.

At the end of the pipeline, an error-bit history vector is available for the instruction, and this vector is routed to the history matrix 290 for storage therein. As shown schematically in FIG. 3, additional error information can also be added to this error-bit history vector, for example based on an error check performed by the circuit 325 based on error detection data 315 associated with an instruction accessed from the instruction cache 310 during the fetch stage 200, or a similar error check performed by the circuit 320 based on error detection data 305 associated with data stored within a cache line of the data cache 300 accessed during the write back stage 275 (for example due to execution of a load or store instruction). It will be appreciated that other error information could also be assimilated into the history vector if required, for example based on error detection checks made in respect of the contents of registers of the register file when the registers are accessed during the register read stage 230.

Accordingly, it will be appreciated that in the embodiment of FIG. 3 an error-bit history vector is constructed for each instruction, with that vector then being added to the history matrix 290. The history matrix will typically have a finite number of entries, and accordingly as each new history vector is added, the oldest history vector will be discarded, such that the history matrix provides a shifting error-bit global history based on the local transient faults detected by the various error detecting circuits 210, 225, 240, 255, 270, 320, 325. The fault monitoring logic 295 then monitors the history matrix 290, using the process discussed earlier with reference to FIG. 2, in order to determine whether the current contents of the history matrix are indicative of a random transient fault or a coordinated transient fault attack (referred to in the figure as a security fault attack).

Figure 4:
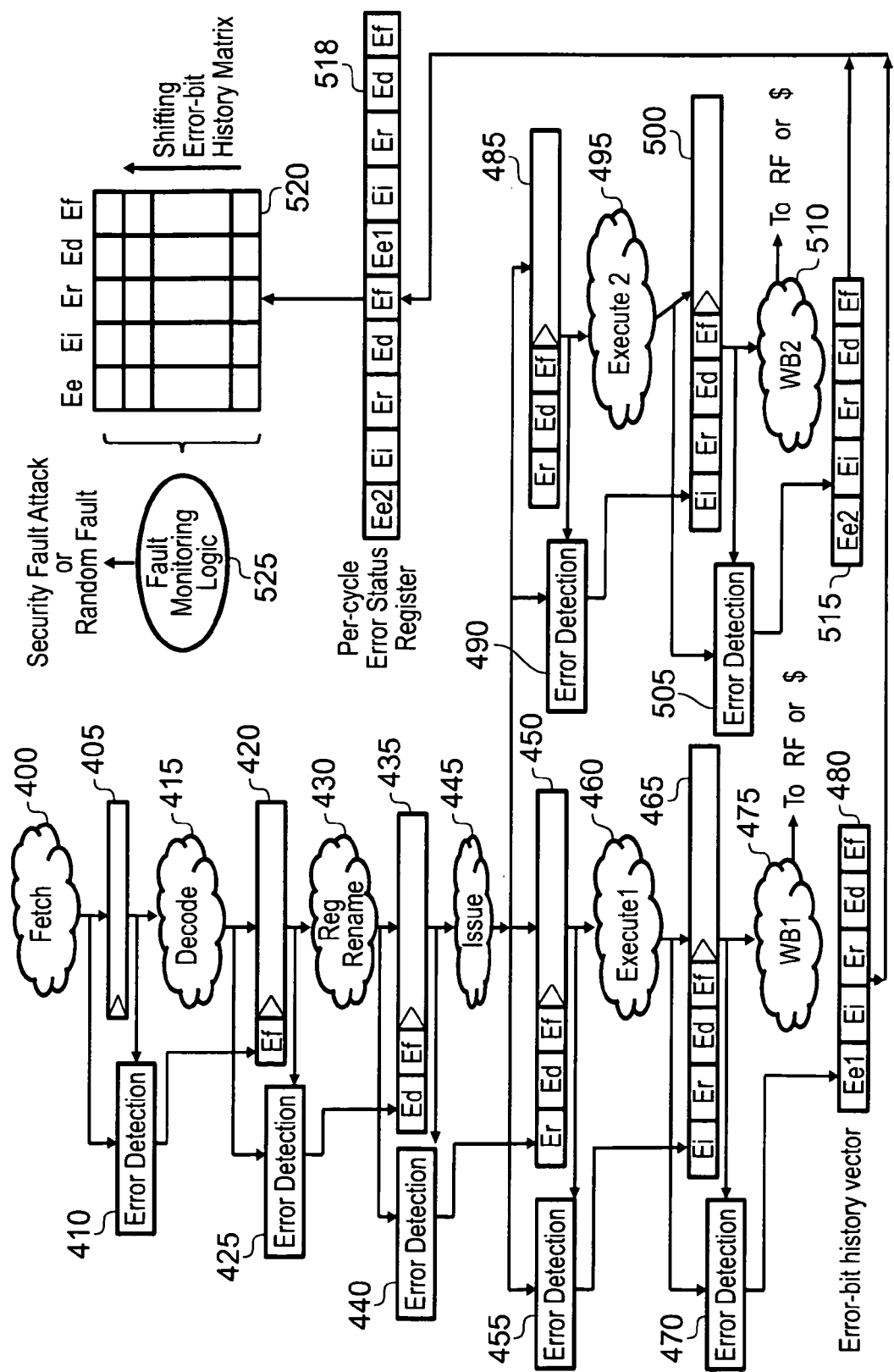
FIG. 4 is a diagram schematically illustrating a data processing apparatus in accordance with an alternative embodiment.

FIG. 4 illustrates another example embodiment, where the pipelined processor has a superscalar configuration providing multiple execute stages (in this example two execute stages). In this embodiment, the fetch 400, decode 415, register rename 430 and issue stages 445 are shared between the multiple execute stages, and as with FIG. 3 the pipeline register 405, 420, 435 separating each stage is provided with its own error detection circuit 410, 425, 440. In addition, each pipeline register 450, 465, 485, 500 associated with the two execute stages 460, 495 is also provided with its own error detection circuit 455, 470, 490, 505. The error-bit history vectors 480, 515 that are produced at the end of each pipeline are then written to a per-cycle error status register 518, from where they are then written one vector at a time into the history matrix 520. The fault monitoring logic 525 then operates in the same way as the fault monitoring logic 295 of FIG. 3.

Figure 5:
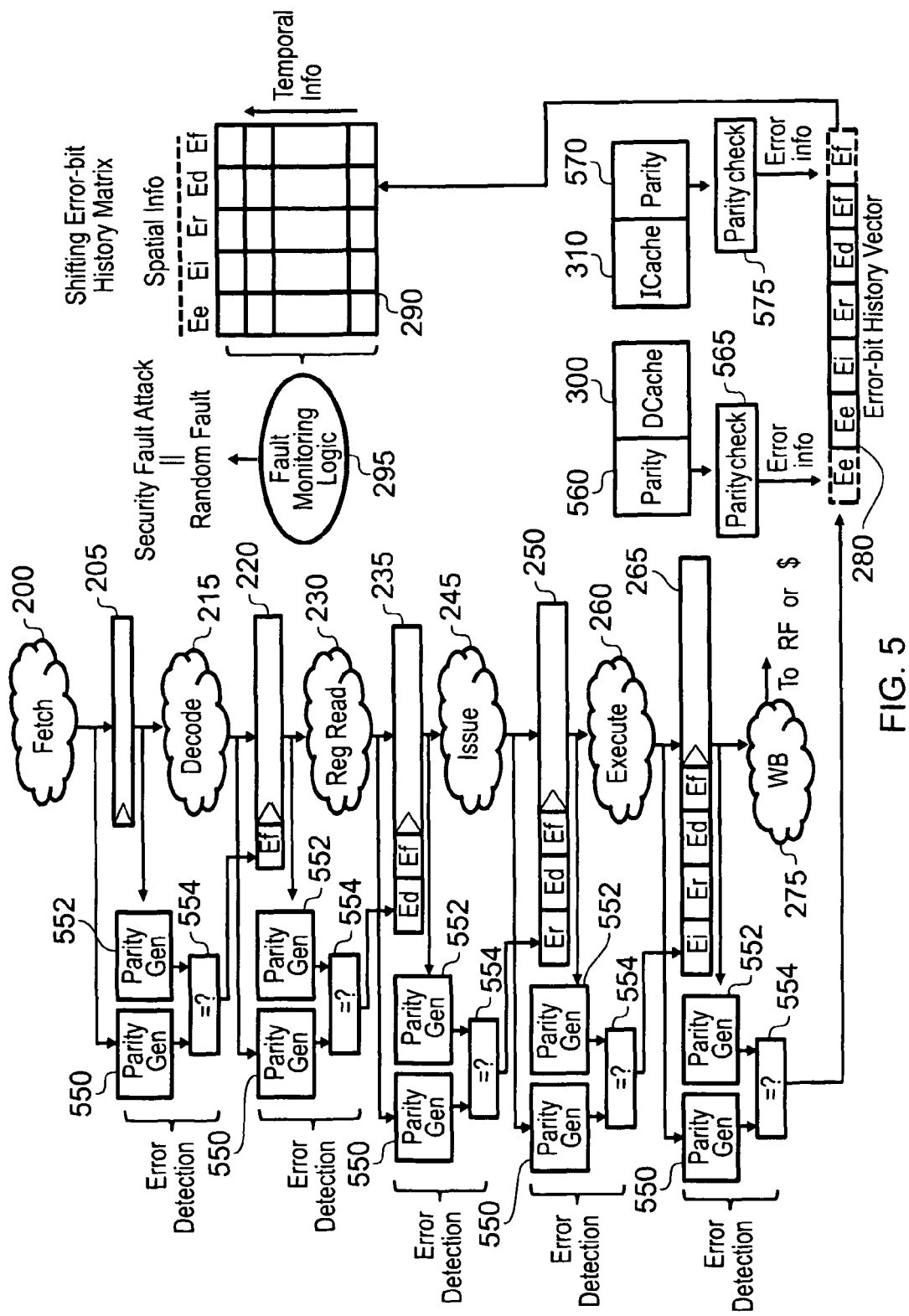
FIG. 5 is a block diagram illustrating one particular implementation of the error detection circuits within the embodiment of FIG. 3.

FIG. 5 provides a particular example of the circuitry of FIG. 3, where the error detection blocks are provided by parity checking circuits. In particular, each of the error detection blocks 210, 225, 240, 255, 270 of FIG. 3 are constructed by a pair of parity generating circuits 550, 552, along with a comparator 554. In particular, based on the data being stored in an associated pipeline register, the parity generator 550 generates a first parity value, and then based on the data output from that pipeline register, the parity generator 552 generates a further parity value. These two parity values are compared by the comparator 554, and if equal result in a logic zero value being output. However, if they differ, this indicates the presence of a transient fault, and a logic one value is output. As shown in FIG. 5, the data cache 300 and instruction cache 310 may also have parity data 560, 570 associated with the various cache lines or portions of cache lines, and that parity data can be provided to the parity checking circuits 565, 575 in order to produce additional error information based on the parts of the instruction cache and data cache accessed during execution of the instruction.

Figure 6A:
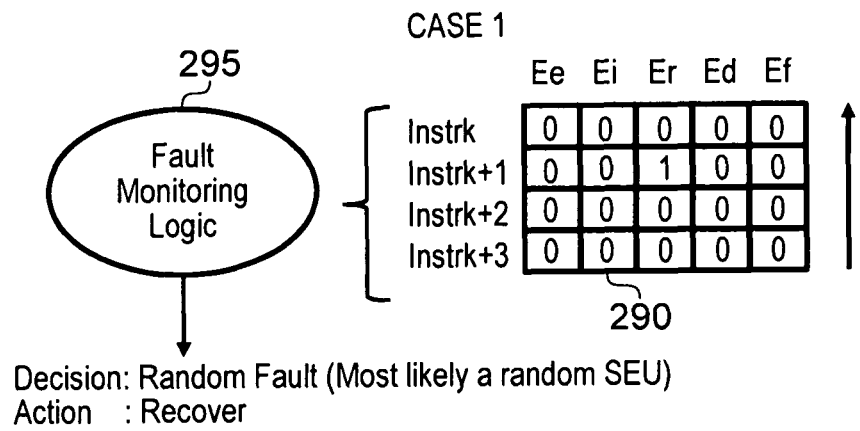
FIGS. 6A and 6B illustrate two example scenarios analysed by the fault monitoring circuitry of embodiments.

FIG. 6A illustrates an example scenario where the error-bit history matrix 290 has four entries, meaning that at any time the fault monitoring logic 290 can observe the global transient fault history for four executed instructions. In the snapshot of the history matrix 290 captured in FIG. 6A, the matrix indicates that there is a single transient fault associated with the instruction k+1. In this case, the monitoring logic decides, using the earlier described process of FIG. 2, that this is a random phenomenon, and hence that a standard random transient fault has been detected. A recovery action can then be initiated if required as discussed earlier.

Figure 6B:
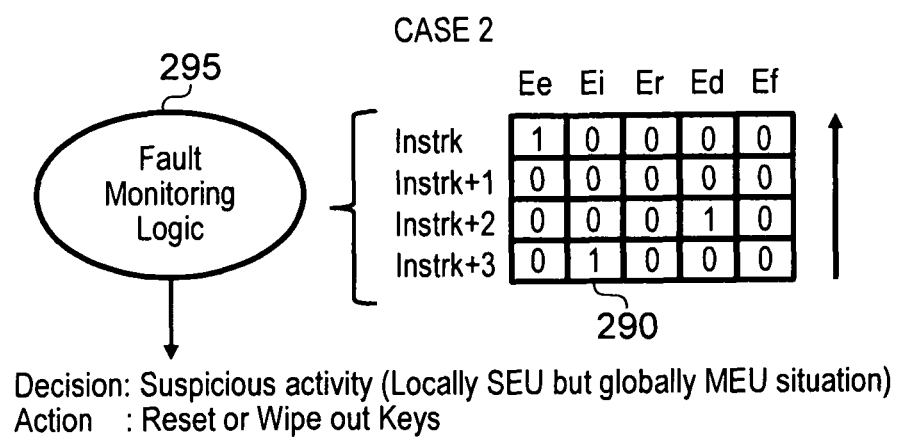

Considering now the scenario of FIG. 6B, the snapshot shows that there are a total of three transient faults in three different instructions at three different times. This is a very suspicious situation that is far from being stochastic. Accordingly, in this scenario the fault monitoring logic determines that whilst the activity would be locally viewed as a standard single event upset, from the global view point it represents a multiple event upset (MEU) situation, thereby indicating the presence of a coordinated transient fault attack. Accordingly, a countermeasure action is initiated as discussed earlier, for example by resetting the processor, or in extreme cases wiping out the secret keys and data.

Figure 7A:
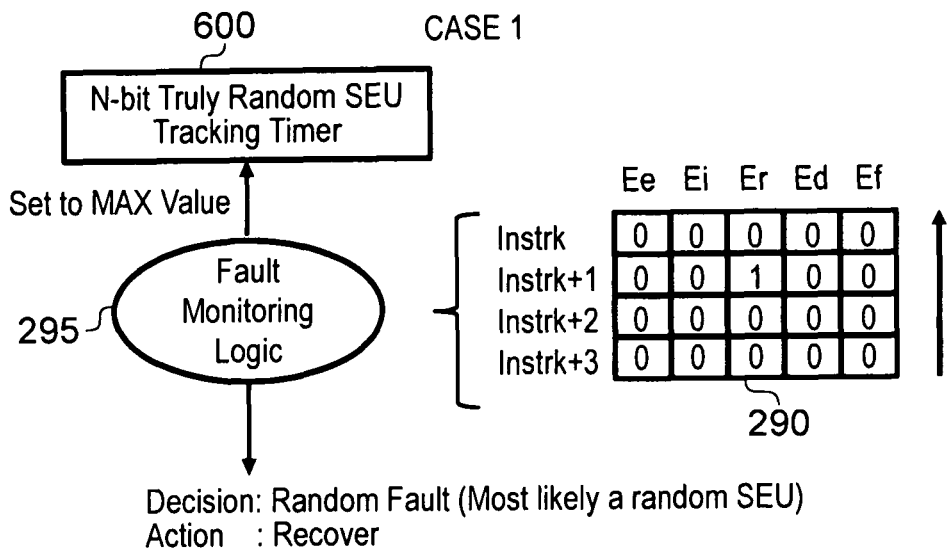
FIGS. 7A and 7B illustrate a scenario that can be detected using the fault monitoring circuitry of embodiments when a tracking timer is used in addition to the history matrix.
Figure 7B:
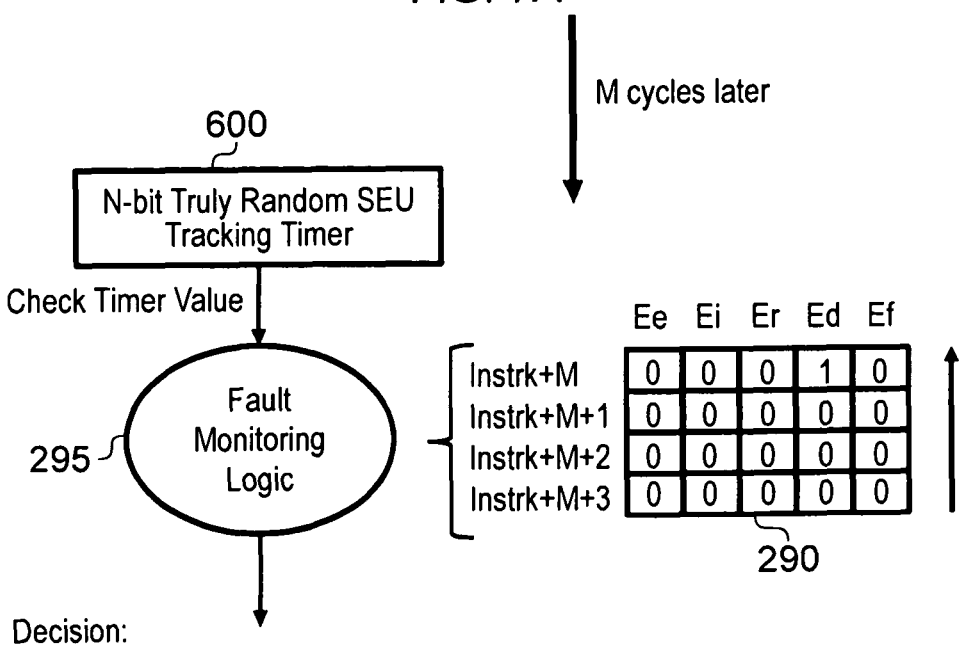

FIGS. 7A and 7B illustrate an alternative scenario, where the optional fault tracking timer 98 of FIG. 1 is used, in FIGS. 7A and 7B this being formed by the N-bit truly random SEU tracking timer 600. This embodiment is aimed at correctly detecting a coordinated transient fault attack even if the attack is performed in laboratory conditions using precise ionising radiation equipment, thereby only inducing a single bit upset at any point in time. In particular, as shown in FIG. 7A, the snapshot of the history matrix considered at that time identifies a single bit error and hence identifies this as being indicative of a random transient fault condition. In addition to identifying the random transient fault and taking any recovery action necessary, in this embodiment the fault monitoring logic 295 also sets the tracking timer 600 to a maximum value. Each clock cycle the timer is then decremented.

FIG. 7B then illustrates a situation M cycles later. As shown by the snapshot in FIG. 7B, again only a single transient fault is present within the history matrix, and hence in isolation this would appear to represent another random transient fault. However, the fault monitoring logic additionally references the timer 600, and if the timer is not zero, then this indicates a suspicious activity, since having two truly random transient faults in very close proximity in time is improbable, the maximum value of the timer having been set to represent a time during which one would not expect in practice to have two truly random transient faults. Accordingly, in this situation, the fault monitoring logic takes a security precaution and flags this as representing a security intrusion, i.e. being indicative of a coordinated transient fault attack. Thus, a countermeasure action will be initiated. However, conversely, if the timer is zero, this confirms that the observed activity in the history matrix is indicative of a random transient fault.

Figure 8:
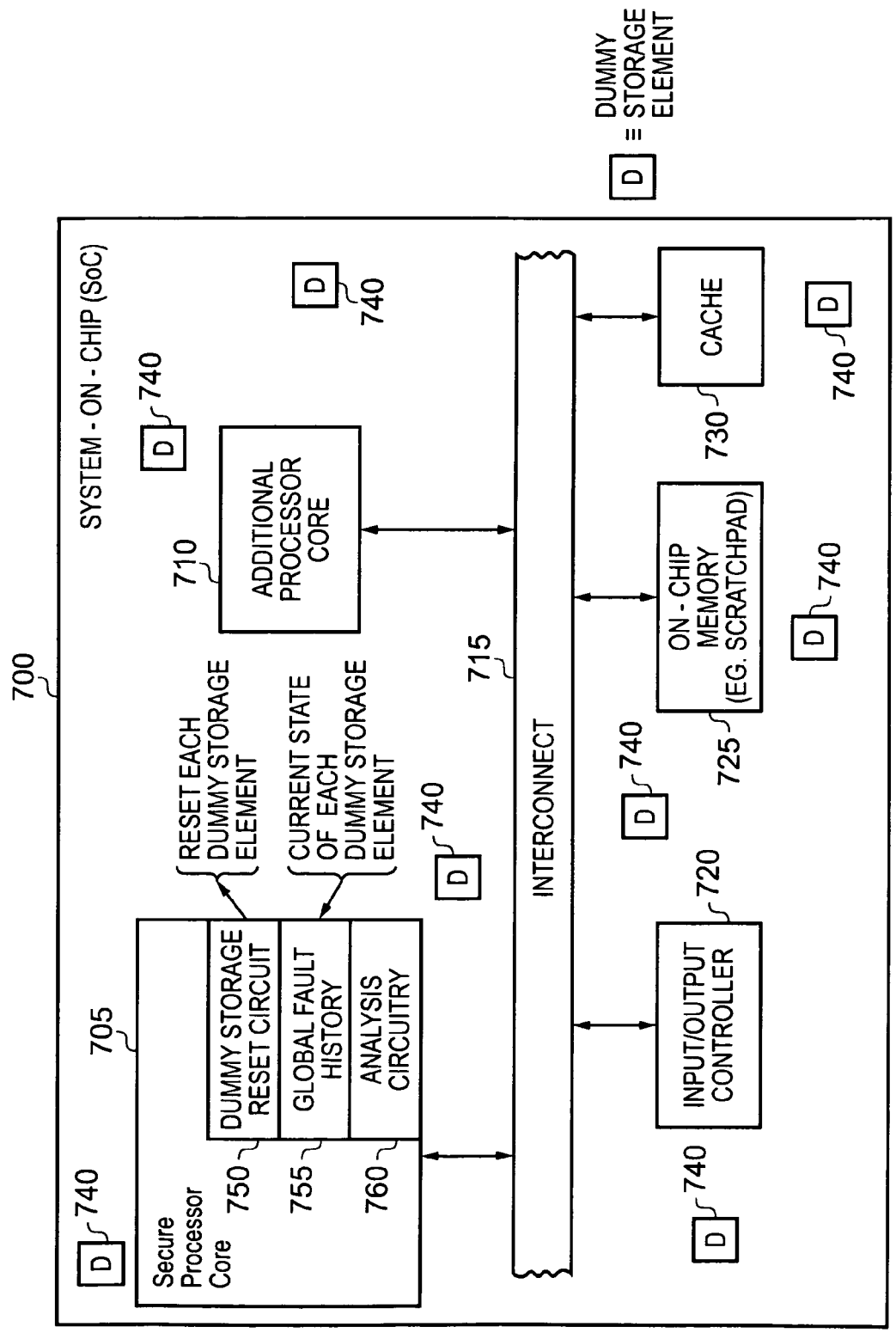
FIG. 8 illustrates a data processing apparatus in accordance with an alternative embodiment.

FIG. 8 illustrates an alternative embodiment where the data processing apparatus takes the form of an integrated circuit such as a System-on-Chip (SoC) 700. The SoC may comprise a number of processor cores such as the secure processor core 705 and the additional processor core 710. These processor cores are connected via an interconnect bus network 715 to a variety of devices, such as an input/output controller 720, an on-chip memory 725 (often referred to as a scratch pad) and an on-chip cache 730. In accordance with this embodiment, a number of dummy storage elements 740 are distributed within the SoC, whose values can be set to a predefined state. In one embodiment, a dummy storage reset circuit 750 is provided for resetting each dummy storage element to the predefined state, but as will be discussed in more detail later with reference to FIG. 9 in certain embodiments such a dummy storage reset circuit 750 may not be required.

In this embodiment, the secure processor core also contains a global fault history circuit 755 which maintains the earlier-discussed global transient fault history data based on the current state of each dummy storage element 740. The secure processor core 705 also includes analysis circuitry 760 which can be considered analogous to the analysis circuitry 80 of FIG. 1, and performs the process described earlier with reference to FIG. 2. Typically, the dummy storage reset circuit 750 and the global fault history circuit 755 will be provided by dedicated hardware blocks within the secure processor core. The analysis circuitry 760 can also be a dedicated hardware block, or in alternative embodiments the function of the analysis circuitry can be performed by suitable software executing on the secure processor core 705.

The dummy storage elements 740 can be formed in a variety of ways. In one embodiment, they are formed by flip flops or single-bit registers randomly distributed within the SoC solely for the purpose of providing input to the global fault history. In such embodiments, the dummy storage elements can be placed anywhere within the SoC where space permits and hence can typically provide good coverage for the entire area of the SoC, to ensure that any coordinated transient fault attack is likely to trigger transient faults within some of the dummy storage elements.

Figure 9:
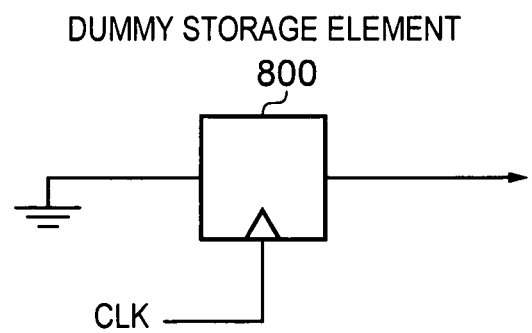
FIG. 9 illustrates one example of a dummy storage element that may be used within the embodiment of FIG. 8.

When providing the dummy storage elements as dedicated elements provided solely for the purposes of providing input to the global fault history circuitry 755, each dummy storage element can in one embodiment be constructed as shown in FIG. 9. In particular, the dummy storage element 800 has its input tied to ground such that on each rising edge of the clock signal it outputs a logic zero value. A single event upset within the storage element 800 may cause a transient fault whereby the storage element state flips to a logic one state, and hence on the next rising edge of the clock a logic one value will be output. However, at the same time, the storage element state will be naturally reset to the logic zero value due to the input being tied to ground Hence, if all of the dummy storage elements are arranged in such a way, there is no need for the dummy storage reset circuit 750 shown in FIG. 8.

However, in alternative embodiments there is no need for the dummy storage elements to be provided by such dedicated storage elements introduced solely for that purpose. Instead, it is possible to make use of pre-existing storage elements which are not used in the normal mode of operation, and hence can be set into a predefined state by the dummy storage reset circuit 750, with any change of state in any of the registers then being indicative of a transient fault. For example, it is common to distribute spare standard cells in a physical implementation, for a subsequent metal fix. The spare register cells could by default be linked to the global fault history circuitry 755. As another example, it is common to have functionality that is used during design and test but is generally not used when the SoC is then deployed actively in the field. One example would be debug and trace circuits. At design time, such circuitry could be designed to have a mode of operation where the registers in that circuitry contribute inputs to the global fault history circuitry if the circuitry is not being used for its main purpose. Hence, by way of example, if the debug circuitry is disabled, the registers within the debug circuitry could be used to provide inputs to the global fault history circuitry 755. As yet a further example, it may be that, in certain modes of operation, the additional processor core 710 is not used, and in such instances, when the SoC is operating in those modes of operation, registers within the additional processor core 710 could also be used to form at least some of the dummy storage elements providing input to the global fault history circuit 755.

From the above described embodiments, it will be appreciated that such embodiments provide a mechanism for detecting and differentiating between security-related, coordinated fault attacks and reliability-related random transient faults within a data processing apparatus by monitoring transient fault activity both spatially and temporally. Further, such detection and differentiation can be achieved in particular embodiments without using any redundant hardware or software re-execution.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A data processing apparatus comprising:
    a plurality of storage elements residing at different physical locations within the data processing apparatus;
    fault history circuitry configured to detect local transient faults occurring in each storage element of said plurality of storage elements, and to maintain global transient fault history data based on the detected local transient faults; and
    analysis circuitry configured to monitor the global transient fault history data in order to determine based on predetermined criteria whether the global transient fault history data is indicative of random transient faults occurring within the data processing apparatus or is indicative of a coordinated transient fault attack, the analysis circuitry being further configured to initiate a countermeasure action on determination of said coordinated transient fault attack, wherein the fault history circuitry comprises local fault detection circuitry associated with each storage element of said plurality of storage elements, and fault history maintenance circuitry configured to maintain said global transient fault history data based on local transient fault data received from each local fault detection circuitry.

2. A data processing apparatus as claimed in claim 1, wherein the global transient fault history data indicates both spatial and temporal transient fault behaviour within the data processing apparatus.

3. A data processing apparatus as claimed in claim 1, wherein each local fault detection circuitry is configured to correct local transient faults detected in the associated storage element.

4. A data processing apparatus as claimed in claim 1, wherein the analysis circuitry, responsive to determining that the global transient fault history data is indicative of random transient faults occurring within the data processing apparatus, is configured to initiate a corrective action within the data processing apparatus.

5. A data processing apparatus as claimed in claim 1, wherein the fault history circuitry is configured to maintain the global transient fault history data based on detected local transient faults occurring within a predetermined timing window.

6. A data processing apparatus as claimed in claim 1, wherein:
    the fault history circuitry is configured to maintain a fault tracking timer which is initialised to a first value whenever the analysis circuitry evaluates that a current state of the global transient fault history data is indicative of random transient faults occurring within the data processing apparatus;
    the fault tracking timer is configured to adjust its value periodically until a second value is reached; and
    the analysis circuitry is configured to determine presence of said coordinated transient fault attack if the global transient fault history data is indicative of random transient faults occurring within the data processing apparatus but said fault tracking timer does not have said second value.

7. A data processing apparatus as claimed in claim 1, wherein said plurality of storage elements are active storage elements provided for reference by processing circuitry within the data processing apparatus when performing data processing operations.

8. A data processing apparatus as claimed in claim 7, wherein said plurality of storage elements comprise a series of pipeline registers separating pipeline stages of pipelined processing circuitry within the data processing apparatus.

9. A data processing apparatus as claimed in claim 8, wherein:
the fault history circuitry comprises local fault detection circuitry associated with each said pipelined stage, and fault history maintenance circuitry configured to maintain said global transient fault history data based on local transient fault data received from each local fault detection circuitry;
for each instruction processed through the pipelined processing circuitry, the local transient fault data output by the local fault detection circuitry associated with each said pipelined stage is collated to form a transient fault history vector for said instruction; and
the fault history circuitry maintains as said global transient fault history data the transient fault history vector for a predetermined plurality of said instructions.

10. A data processing apparatus as claimed in claim 7, wherein said plurality of storage elements form part of a storage device within the data processing apparatus.

11. A data processing apparatus comprising:
a plurality of storage elements residing at different physical locations within the data processing apparatus;
fault history circuitry configured to detect local transient faults occurring in each storage element of said plurality of storage elements, and to maintain global transient fault history data based on the detected local transient faults; and
analysis circuitry configured to monitor the global transient fault history data in order to determine based on predetermined criteria whether the global transient fault history data is indicative of random transient faults occurring within the data processing apparatus or is indicative of a coordinated transient fault attack, the analysis circuitry being further configured to initiate a countermeasure action on determination of said coordinated transient fault attack;
wherein the fault history circuitry is configured to maintain the global transient fault history data based on detected local transient faults occurring within a predetermined timing window, wherein said predetermined criteria used by the analysis circuitry to detect presence of said coordinated transient fault attack comprises the global transient fault history data indicating that a number of local transient faults above a predetermined threshold have been detected within said predetermined timing window.

12. A data processing apparatus as claimed in claim 5, wherein the fault history circuitry maintains, as the global transient fault history data, a history matrix identifying for each storage element any local transient faults detected within the predetermined timing window.

13. A data processing apparatus comprising:
a plurality of storage elements residing at different physical locations within the data processing apparatus;
fault history circuitry configured to detect local transient faults occurring in each storage element of said plurality of storage elements, and to maintain global transient fault history data based on the detected local transient faults; and
analysis circuitry configured to monitor the global transient fault history data in order to determine based on predetermined criteria whether the global transient fault history data is indicative of random transient faults occurring within the data processing apparatus or is indicative of a coordinated transient fault attack, the analysis circuit being further configured to initiate a countermeasure action on determination of said coordinated transient fault attack, wherein said plurality of storage elements are dummy storage elements not referenced by processing circuitry within the data processing apparatus when performing data processing operations in a normal operating mode, the dummy storage elements each being reset to a predefined state, and a local transient fault in each storage element being detected when its stored state changes from said predefined state.

14. A data processing apparatus as claimed in claim 13, wherein said dummy storage elements are storage elements already provided within the data processing apparatus for use in a mode of operation other than said normal operating mode.

15. A data processing apparatus as claimed in claim 13, wherein said dummy storage elements are provided solely for reference by said fault history circuitry.

16. A data processing apparatus as claimed in claim 15, wherein said dummy storage elements are randomly distributed within said data processing apparatus.

17. A data processing apparatus as claimed in claim 13, wherein said dummy storage elements are reset to said predefined state whenever the analysis circuitry evaluates that a current state of the global transient fault history data is indicative of random transient faults occurring within the data processing apparatus.

18. A method of analysing transient faults within a data processing apparatus, comprising:
detecting local transient faults occurring within each storage element of a plurality of storage elements residing at different physical locations within the data processing apparatus;
maintaining global transient fault history data based on the detected local transient faults;
monitoring the global transient fault history data in order to determine based on predetermined criteria whether the global transient fault history data is indicative of random transient faults occurring within the data processing apparatus or is indicative of a coordinated transient fault attack; and
initiating a countermeasure action on determination of said coordinated transient fault attack;
wherein the global transient fault history is maintained based on detected local transient faults occuring within a predetermined timing window,
wherein the predetermined criteria used during said monitoring step to detect presence of said coordinated transient fault attack comprises the global transient fault history data indicating that a number of local transient faults above a predetermined threshold have been detected within said predetermined timing window.

19. A data processing apparatus comprising:
a plurality of storage element means residing at different physical locations within the data processing apparatus;

fault history means for detecting local transient faults occurring in each storage element means of said plurality of storage element means, and for maintaining global transient fault history data based on the detected local transient faults; and analysis means for monitoring the global transient fault history data in order to determine based on predetermined criteria whether the global transient fault history data is indicative of random transient faults occurring within the data processing apparatus or is indicative of a coordinated transient fault attack, the analysis means for initiating a countermeasure action on determination of said coordinated transient fault attack, wherein the fault history means comprises local fault detection means associated with each storage element means of said plurality of storage element means, and fault history maintenance means for maintaining said global transient fault history data based on local transient fault data received from each local fault detection means.

* * * * *